May 31, 1966 J. O. BENSON 3,253,533
PUFFING FOOD PRODUCTS
Filed May 31, 1962 3 Sheets-Sheet 1

INVENTOR.
JOHN O. BENSON
BY
*Harold D. Jastram*
ATTORNEY

May 31, 1966  J. O. BENSON  3,253,533
PUFFING FOOD PRODUCTS

Filed May 31, 1962  3 Sheets-Sheet 2

INVENTOR.
JOHN O. BENSON

BY *Harold D. Jastram*

ATTORNEY

May 31, 1966  J. O. BENSON  3,253,533
PUFFING FOOD PRODUCTS
Filed May 31, 1962  3 Sheets-Sheet 3

INVENTOR.
JOHN O. BENSON
BY
*Harold D. Jastram*
ATTORNEY

United States Patent Office 3,253,533
Patented May 31, 1966

3,253,533
PUFFING FOOD PRODUCTS
John O. Benson, Mayer, Minn., assignor to General Mills, Inc., a corporation of Delaware
Filed May 31, 1962, Ser. No. 198,936
1 Claim. (Cl. 99—238.5)

This invention relates to an apparatus for treating food products, and more particularly to an apparatus for puffing food products by heating the product in contact with granular material.

Several problems are presented when an attempt is made to uniformly heat food products and additional problems occur when an attempt is made to puff the food product. Uniform application of heat to the product is difficult in a continuous heating apparatus since portions of food products which are closest to the heat source will be heated to higher temperatures than those which enter the apparatus relatively remote from the heat source. This non-uniform application of heat tends to overcook some of the product and leave some of the product relatively uncooked. If a puffing process is involved, the non-uniform application of heat may leave some of the product unpuffed and consequently unmarketable as a puffed product. Ideally each particle of a product such as a flake of cereal dough should be subjected to predetermined cooking temperatures for only a precise period of time. Often the mass heating of products results in some of the product staying in the heating zone too long. Exposure of a product to heat for an excessively long or short period, can result in undesirable product as explained above.

An object of the present invention is to provide new and improved apparatus for treating food products.

Another object of the present invention is to provide improved apparatus for cooking, drying or puffing products in the presence of granulated heat transferring material.

A further object of the present invention is to provide improved apparatus for puffing food products by heating the products in contact with granulated heat transferring material.

A still further object of the present invention is to provide improved apparatus for puffing food products by providing precise control of the temperature of heated, granular heat transferring material which is mixed with the product.

Another object of the present invention is to provide new and improved puffing apparatus which uses a rotary chamber to mix heated granular material with a food product and which separates the material from the product so that the product can be periodically discharged from the chamber.

An apparatus forming a more specific embodiment of the invention may include a heating chamber containing a supply of granulated heat transferring material. A jacket surrounds the chamber and encloses a gas burner which provides the necessary heat to increase the temperature of granulated material to cooking, drying or puffing temperatures. A product such as flakes of a cereal dough, cereal grains, and similar food products is introduced into the chamber through a gravity conveyor while the chamber is rotated. A helical member aids mixture of the food product with the granular material and selectively advances the food product to an open end of the chamber where the product is discharged to a separator. Most of the granular material falls back into the chamber through apertures in the helical member but the portion which is discharged from the chamber with the puffed product is separated from the product in the separator. A conveyor returns the discharged granular material to the chamber where it is reheated. A thermocouple is utilized to sense the temperature of the granulated material in the chamber and controls the gas burner in accordance with the sensed temperature of the material. A circulator affixed to the rear of the chamber continuously circulates the granular material to maintain a uniform temperature near the temperature sensing device.

A complete understanding of the invention may be obtained from the following detailed description of an apparatus forming specific embodiments, when read in conjunction with the drawings in which;

FIGURE 2 is a front view of the apparatus in FIGURE 1 showing the opening in the chamber and showing a separator for separating discharged granular material from a treated product;

Figure 1:
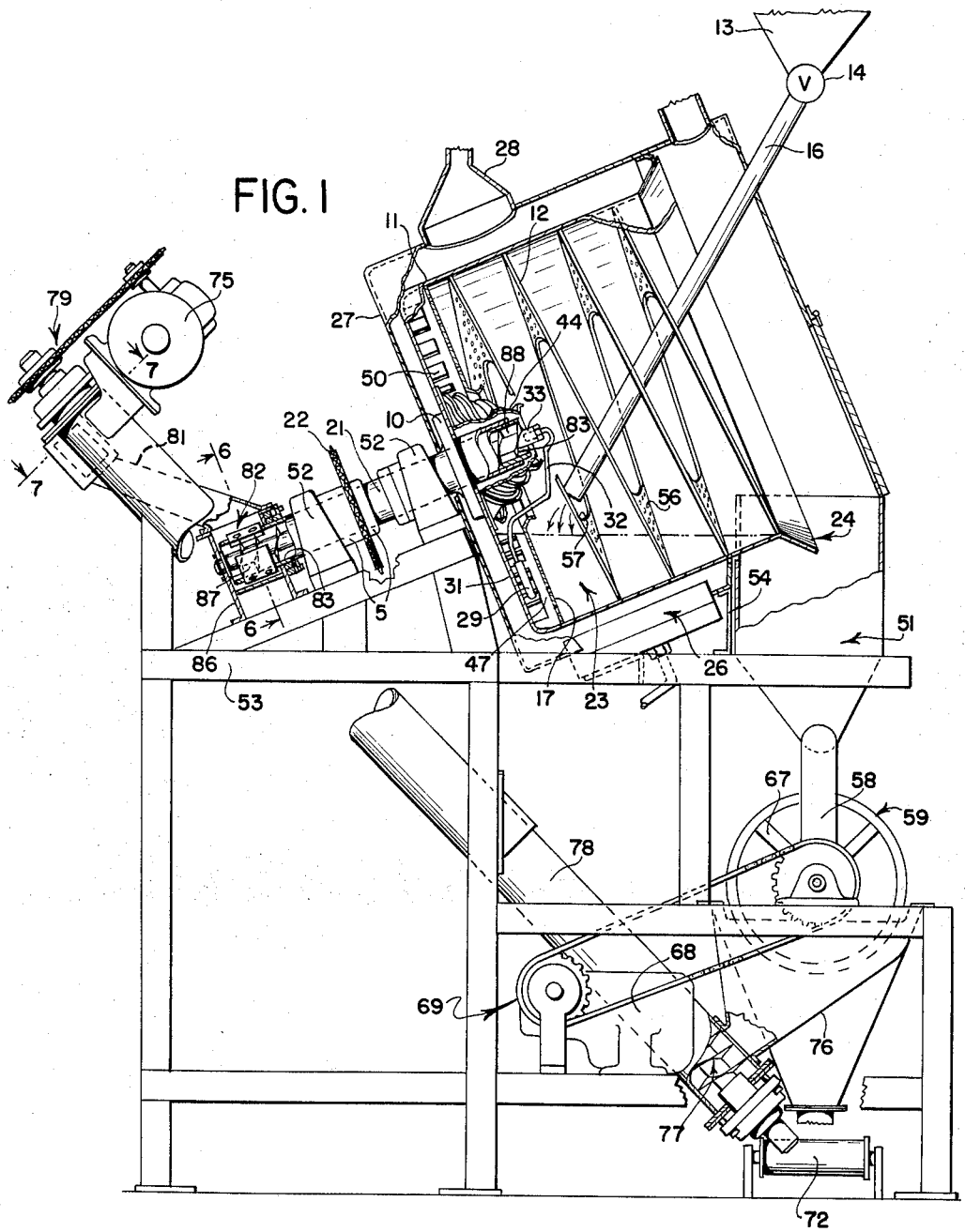
FIGURE 1 is a side view partially in cross section of a food treating apparatus which utilizes a heating chamber having helical members for mixing a product with a heat transferring material.

Referring first to FIGURE 1 there is shown a cross section of a machine according to the present invention. Pan or drum 11 is a cylindrical, oven-like container enclosing a heating zone suitable for heat transfer at desired operating temperatures and filled with granular material, preferably salt. Other granular material such as sand, steel shot or the like may be satisfactorily used, however. On the inner surface of pan 11 is a helical member 12 which is rigidly connected to the inside wall of pan 11. The helical member 12 is perforated with a number of holes which are dependent on the size of the product being dried or puffed. A product which is to be puffed, cooked or heated such as flakes of dough are introduced into pan 11 from a hopper 13. A valve 14 regulates the rate of flow of flakes from hopper 13 through conduit 16. This valve 14 should be of the type that maintains a uniform rate of flow of material to avoid momentary overloading which might result from surges of material. The product which may be thin flakes of cereal dough is introduced into pan 11 in front of backplate 17. Backplate 17 is used to form a false back to which helical member 12 is attached. The backplate 17 forms a zone where granular material can collect so that a heat sensing device 29 can be used to check the temperature of the material.

Figure 3:
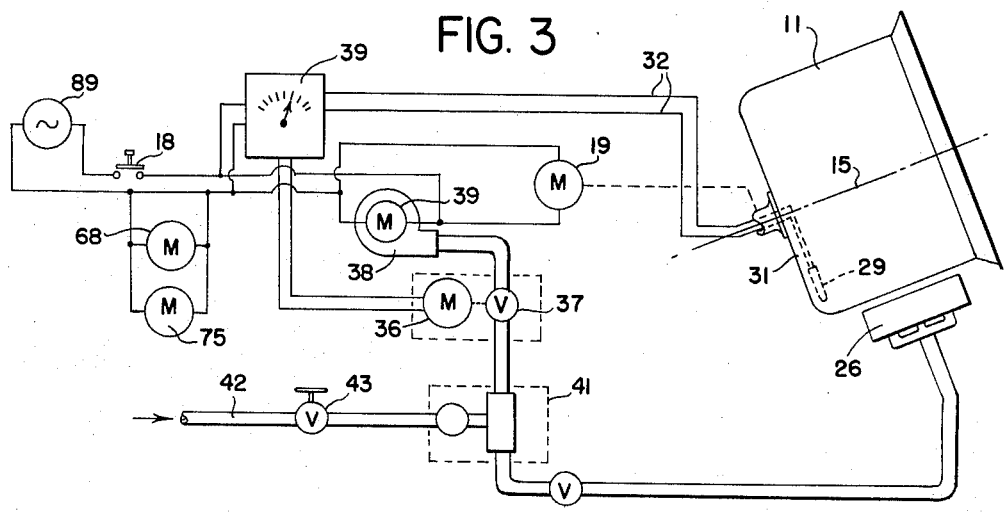
FIGURE 3 is a schematic drawing of the electrical circuitry and gas lines utilized to drive the rotatable chamber and for furnishing gas to a gas burner.
Figure 4:
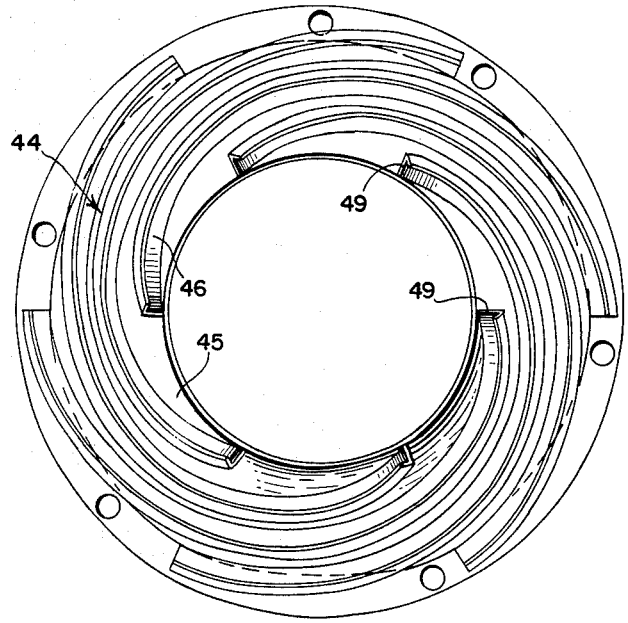
FIGURE 4 is a plan view of a circulator shown in section in FIGURE 1.

When switch 18 (see FIG. 3) is closed, motor 19 is energized by A.-C. source 89, to rotate pan 11 about its central axis 15. Source 89 also furnishes power for other motors in the system. Motor 19 is connected to hollow shaft 21 through a sprocket wheel 22 and a chain 25 which is shown in the FIGURE 2 of the drawings. Sprocket wheel 22 is connected to shaft 21 between two sleeves 5 which position and secure the sprocket wheel 22. Pan 11 is rigidly connected to shaft 21 by a flange 10 which is attached by bolts or other means to the back wall 31 of pan 11. Shaft 21 is rotatably mounted in bearing supports 52 which are in turn mounted on frame 53. The pan 11 is rotated in the clockwise or arrow direction as viewed in FIGURE 2 so that the flights of helical member 12 advance the product from zone 23 to the discharge opening or exit 24 of pan 11. The helical member 12 operates to agitate and aid mixture of the product with a granular material such as salt, which is between the flights of the perforated helical member 12. The rotary motion of the pan 11 lifts the granular material and product and causes it to cascade to intimately mix the two materials. The product is actually submerged in the granular material. The agitation and mixing insures that the granular material and product are in uniform physical contact for an extended period of time thus insuring uniform heat transfer to the product. Also since the granular material is relatively fine as compared to the product, the material transfers heat to the product without damaging the product if the product happens to be a fragile, flaky material rather than a whole cereal grain which may also be puffed.

The rate of rotation of pan 11 is coordinated with the pitch of the helical member 12 to vary the retention time of the product. Retention time is the period of time which the product remains in the pan 11 submerged in the bed of granular material. The retention time can be varied from as few as 6 seconds or less to as long as 20 seconds or more depending on the temperature of the granular material; the product being cooked puffed, or dried; the extent of cooking, puffing or drying desired and internal characteristics of the product such as its moisture content prior to introduction into the pan 11. As an example, the retention time which can be used to puff flakes of a composite cereal dough, dough composed of several cereal grains, is preferably varied from 6 seconds to 20 seconds with the bed of salt maintained at a temperature of from about 315° to about 475° F. This assumes that the flakes have a moisture content of preferably between 6–13% moisture. Other concentrations of moisture are acceptable, however. A preferred embodiment of the apparatus for carrying out the method of puffing flakes of a composite cereal dough utilizes a temperature of from about 380°–420° F. as the temperature for the salt or granular material. The pan 11 is then rotated so that the retention time of the flakes is about 7–11 seconds. If the flakes have a moisture content of about 8% to 12%, the flakes will puff to a satisfactory extent and have a tasty flavor.

Acceptable operating conditions both within and without the preferred range are possible. As an example of an operating condition within the preferred range, the temperature of the bed of granular material may be maintained at about 395° F. with the flakes of composite dough containing about 10–11% moisture. If the retention time is about 8 seconds, an acceptable puffed product will result. As an example of acceptable operating conditions beyond the preferred, the temperature of the bed of granular material may be maintained at 425° F. with the flakes of dough containing about 12.7% moisture. The preferable retention time for these conditions is about 12 seconds with the result that an acceptably puffed product is produced.

A gas burner 26 is utilized to heat the granular material, which is the heat transferring medium or material, in pan 11 to a predetermined temperature depending upon the puffing characteristics of the product. A jacket 27 surrounds pan 11 and burner 26 is mounted between inside walls of the jacket 27 and the outside wall of pan 11. With this arrangement the burning gases from burner 26 are directed to flow about pan 11 to uniformly heat pan 11 before they are discharged through hood 28.

Since the granular material such as salt is the heat transferring medium which heats the product, a precise uniform temperature is maintained in the material bed in pan 11. Precise control of the burner 26 is necessary if satisfactory heating of the product is to take place. A heat sensing device 29 is positioned between the back wall 31 of pan 11 and the perforated backplate 17 of helical ember 12 to sense the temperature of the granular material in that area. The backplate 17 is perforated so that granular material can freely flow into zone 47. The heat sensing device 29 may be a thermocouple with electrical wires 32 which are introduced into pan 11 through a hollow shaft 33 mounted within hollow shaft 21. When the heat sensing device 29 senses a change in temperature in the bed of granular material, an electrical signal is sent to regulator 34 (see FIGURE 3). Regulator 34 then closes a circuit to energize electric motor 36 so that air valve 37 is opened or closed in accordance with the signal received from heat sensing device 29.

If a valve 37 is opened, a larger supply of air from blower 38 which is driven by motor 39 is introduced into fuel mixer 41. A supply of gas is introduced into mixer 41 through line 42 and valve 43. The larger volume of air mixed with a predetermined portion of gas in mixer 41 alters the flame characteristic at burner 26 to change the temperature of the body of granular material in pan 11. Thus it can be seen that exact control of the temperature in the heat transferring medium, such as salt, is closely regulated at all times to maintain favorable puffing conditions for the product. In the case of puffing flakes of a composite cereal dough, the temperature of the salt bed is maintained at from 315° F. to 475° F. preferably at a temperature of from 380° to 475° F. If whole grain cereals are puffed, then the temperature may vary somewhat from the noted range however, most acceptable puffing will take place within the noted ranges. If the product is to merely be dried, the temperature may also vary from the noted range to produce the desired extent of drying. These various temperatures and ranges may be adapted, however, to the product involved and the process to be carried out in order to obtain a satisfactory product whether it be dried, puffed or cooked.

Since the temperature of the granulated material bed is relatively important, the temperature of the material which surrounds heat sensing device 29 must remain uniform and must be indicative of the temperature of the material which is mixed with the product between the flights of helical member 12. To insure a constant circulation of material near sensing device 29, a circulator 44 and flights 50 are utilized to remove the salt from around the device 29 and deposit it in front of backplate 17 where it will mix with the granular media mass. The circulator 44 is the shape of a frustrum having lifting flights 46 on the outer conical side 45. Circulator 44 is mounted within pan 11 to wall 31 so that as pan 11 is rotated on shaft 21, the circulator 44 also rotates. Granular material from heat zone 47 is picked up by flights 50 which are attached to the inner wall of pan 11 at spaced intervals and is deposited on circulator 44. The material is captured by flights 46 of circulator 44. The deposited material moves along the conical sides of the circulator 44 in the troughs 48 of flights 46 and is discharged into heat zone 23. Flights 46 have an L cross-sectional configuration so that the material is not discharged until it arrives at the termination 49 of flights 46 near the minor surface of the frustrum shaped circulator.

As previously noted, rotating helical member 12 advances the material and the product from heat zone 23 to the successive zones between the flights of member 12. Finally the flights convey the product to the exit or discharge opening 24 where the product with a small portion of accompanying granular material salt is discharged into a hopper 51. The rotational speed of the pan 11 can preferably be varied so that the product remains in the pan for as few as 6 seconds to as long as 20 seconds. Shaft 21 and pan 11 are mounted on bearing supports so that the central axis 15 of pan 11 is at an angle with respect to the horizontal. Additional support is furnished for jacket 27, brackets 54 which are mounted on frame 53. With the pan 11 thus mounted at a predetermined angle, two components of force are simultaneously acting on the body of granular material and the product. One component of force is the gravitational force which tends to pull the product and material away from discharge opening 24 and back to heat zones 23 and 47 in pan 11. The other component of force is furnished by the flights of the helical member 12 which tends to move the material and product towards the discharge opening 24 of pan 11. In the interest of conserving fuel and maintaining a uniform temperature in the body of heat transferring granular material, apertures 56 are provided in helical member 24 which are large enough, to permit the granular material to flow, under the influence of gravity, back to heat zones 23 and 47. The apertures 56, however do not permit the product flakes either in the raw state or in the puffed condition, and which are uniformly intermixed with granular material, to flow to zones 23 and 47 under the influence of gravity. Consequently, helical member 12, in addition to mixing the material and produce, selectively conveys the product from heat zone 23 to the discharge opening 24 for deposit into hopper 51. If no apertures are placed in member 12, discharge of the material with the product with continuous replacement of the material is possible with some loss of heat efficiency.

Since the rotational speed of pan 11 and helical member 12 can be precisely controlled with an electric motor such as motor 19 and since temperature sensing device 29 can be used to precisely regulate the temperature of the heating transferring material, the time which the product is surrounded by the heat transferring material can be precisely controlled to produce a product which is uniformly heated and puffed to uniform consistency prior to discharge from the heating zone. The peripheral velocity of the pan 11 must be great enough to produce the desired mixing of the material and product without disturbing the control of the time the product is in the pan. These factors can be changed extensively depending on the various physical relationships of the mechanical elements. The optimum height of the heat transfer material bed is slightly below the inside surface 57 of the helical flights of member 12. If the granular material is permitted to run over the inside surface 57 of the helix, the intermixed food product will also flow over the surface 57 thus destroying the precise control of the time which the product spends intermixed with the heat transfer material. Apertures 56 provide the necessary openings to permit most of the granular material to flow back into pan 11 under the influence of gravity and also to prevent the material from accumulating to an undesirable height so that it will flow over surface 57. The product of course is much too large to flow through the apertures 56 and thus advances to discharge opening 24.

In spite of the provisions for permitting the granular heat transfer material to flow back to zone 23, a certain amount of material will occasionally be discharged with the product through opening 24 of the hopper 51. The discharged material and product flow through conduit 58 into a separator 59 where the material is separated from the puffed product. As the material and product emerge from opening 61, it is flowing at a speed great enough so that it is discharged a great distance into separator 59. If this condition were permitted to go unattended, the material would not be separated from the product through the screen 62 which forms the first section of separator 59. To prevent the material and product from overshooting screen 62, a buffer 63 is placed to intersect the path of the discharged product and material so that the material and product engage screen 62 at the left end as viewed in FIGURE 2.

Separator 59 is a rotary separator having a shaft 65 mounted on bearing supports 64. Screens 62 and 66 are cylindrical screens which engage a supporting member 67 so that screens 62 and 66 can be rotated about their central axes by motor 68 connected to shaft 65 by sprocket assembly 69.

The material and product discharged into separator 59 then travels the length of the separator from the entrance across screen 62 where the salt is discharged and then to screen 66. Screen 66 may be a 4 gauge screen designed to separate broken particles of product from the remainder of the product. The finished product is discharged from opening 71 of separator 59 onto a conveyor 72 which conveys the finished product to subsequent processing stations. The broken products or fines are discharged into hopper 73 where they are disposed of through conduit 74.

Figure 7:
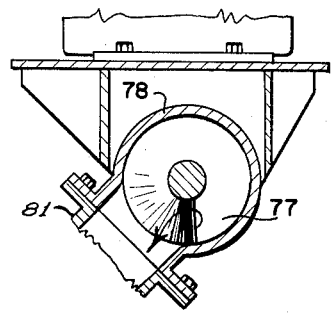
FIGURE 7 is a sectional view taken along lines 7—7 of a portion of a conveyor system shown in FIGURE 1.
Figure 5:
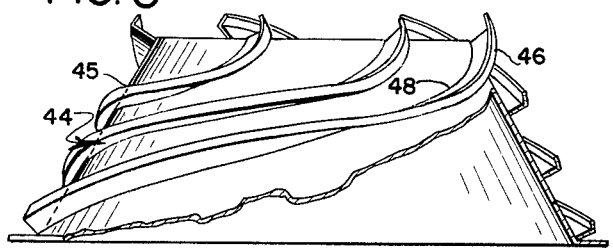
FIGURE 5 is a side view of the circulator shown in FIGURE 4.
Figure 3:
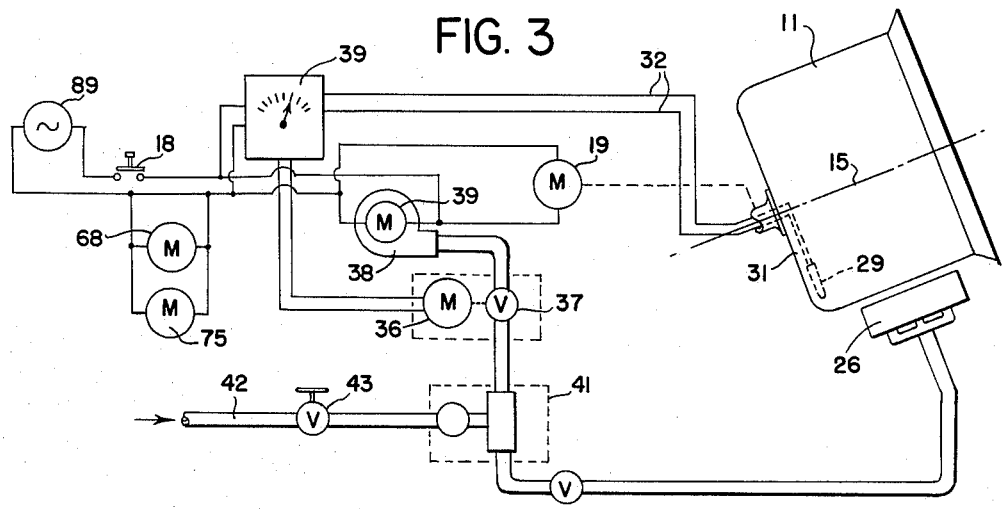
Figure 4:
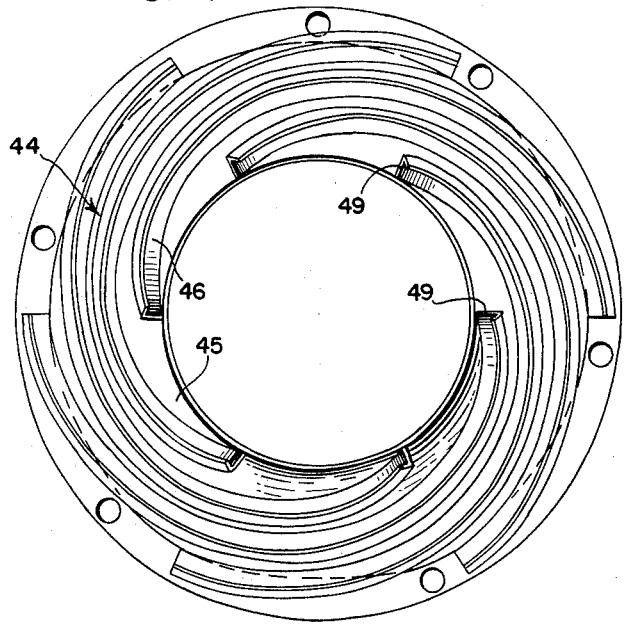
Figure 6:
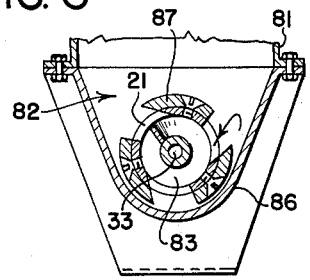
Figure 5:
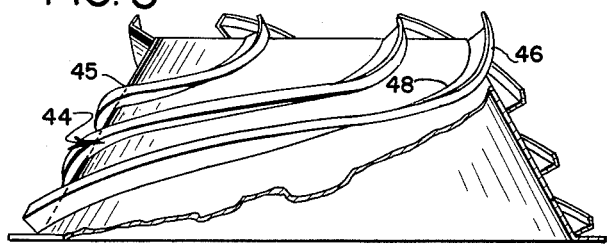
Figure 7:
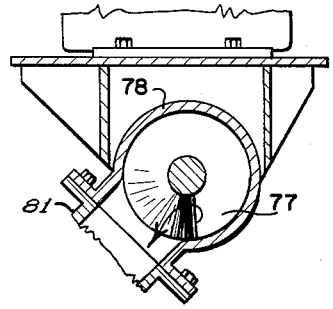

The granular material is discharged from screen 62 into hopper 76 where it is discharged into a screw conveyor 77. Conveyor 77, housed in housing 78, is driven by motor 75 (see FIG. 3). Conveyor 77 is driven by motor 75 through a chain and sprocket assembly 79 (see FIG. 1). The salt is conveyed from hopper 76 up the length of screw conveyor 77 where it is deposited in a conduit 81 (refer to FIG. 7). The arrow in FIG. 7 shows the path taken by the conveyed granular material as it is moved along housing 78 by the spiral flights of conveyor 77 for deposit in conduit 81.

Other types of separators may be used to separate the material and product such as separators which discharge the product and material and depend on relative differences in weight and air resistance to effectuate separation.

Figure 6:
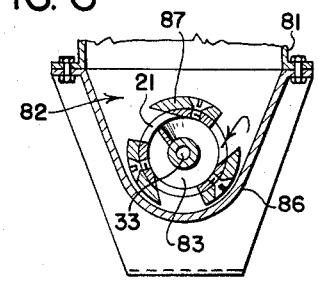
FIGURE 6 is a sectional view taken along lines 6—6 of a portion of a conveyor system shown in FIGURE 1.

The granular material flows down conduit 81 under the influence of gravity and is deposited into a reservoir 82 (see FIG. 6). Conveyor 83 is mounted on a hollow shaft 33. Shaft 33 is rigidly mounted to housing 86 of the reservoir 82 so that auger 83 and shaft 33 remain stationary. Housing 86 is mounted on frame 53 by suitable means. Shaft 21 not only provides the means for transmitting rotational force to pan 11 but also acts as the housing for conveyor 83. Scoops 87 are mounted for rotation at the termination of shaft 21 so that material from reservoir 82 is forced into the spiral flights of conveyor 83. The material is forced along the flights of conveyor 83 by the combined forces furnished by the rotating shaft 21 and the scoops 87 so that the material is conveyed up the length of conveyor 83 and is discharged at opening 88 into heat zone 23 in pan 11. This returning granular material is mingled with the product introduced into conduit 16 and granular material which has remained in pan 11 so that it is reheated with the introduced product.

It is to be understood that the above described arrangements are simply illustrative of the application of the principles of the invention. Numerous other arrangements may be readily devised by those skilled in the art which will employ the principles of the invention and fall within the spirit and scope thereof. The embodiments of the invention in which an exclusive property or privilege is claimed are defined as follows:

A continuous cooking apparatus comprising a rotary cooking chamber for containing granular heat transferring material and having a discharge opening, said chamber being tilted to provide a material reservoir, means for heating said material, means for charging said chamber with a product, a helical member having perforations and which is movable with said chamber for mixing said product and said material and for advancing said product to said opening, said perforations permit said material to flow away from said opening and into said reservoir as said product is advanced toward said opening, a heat sensing device associated with said material which controls said means for heating, means including material lifting flights mounted in said chamber for circulating said material to maintain a uniform material temperature near said sensing device, a separator for separating said product from portions of said material discharged from said opening, means associated with said separator for directing the flow of said product and material into said separator, and a conveyor for returning said discharged material to said chamber.

(References on following page)

References Cited by the Examiner

UNITED STATES PATENTS

| | | | |
|---|---|---|---|
| 1,550,860 | 8/1925 | Wiseman. | |
| 2,086,181 | 7/1937 | Bonotto | 99—237 |
| 2,299,080 | 10/1942 | De Back | 99—443 |
| 2,321,016 | 6/1943 | De Back | 99—443 |
| 2,427,388 | 9/1947 | Curran | 99—443 |
| 2,474,369 | 6/1949 | Ray. | |
| 2,701,200 | 2/1955 | Huber | 99—81 |
| 2,858,218 | 10/1958 | Benson | 99—81 |
| 2,858,761 | 11/1958 | Deniss | 99—238.7 |
| 2,860,569 | 11/1958 | Pitman | 99—443 |
| 2,872,386 | 2/1959 | Aspegen | 165—88 X |
| 2,922,355 | 1/1960 | Green | 99—238.6 |
| 3,035,918 | 5/1962 | Sorgenti et al. | 99—194 X |
| 3,086,444 | 4/1963 | De Back | 99—404 X |
| 3,117,064 | 1/1964 | Friedrich | 165—106 X |

IRVING BUNEVICH, *Primary Examiner.*

A. H. WINKELSTEIN, JEROME SCHNALL,
*Examiners.*

UNITED STATES PATENT OFFICE
CERTIFICATE OF CORRECTION

Patent No. 3,253,533                                  May 31, 1966

John O. Benson

It is hereby certified that error appears in the above numbered patent requiring correction and that the said Letters Patent should read as corrected below.

Column 3, line 55, after "at" insert -- about --; column 4, line 1, for "ember" read -- member --.

Signed and sealed this 1st day of August 1967.

(SEAL)
Attest:

EDWARD M. FLETCHER, JR.                        EDWARD J. BRENNER
Attesting Officer                                       Commissioner of Patents